United States Patent [19]

Aderholt et al.

[11] Patent Number: 4,928,525
[45] Date of Patent: May 29, 1990

[54] SONIC TANK INVENTORY CONTROL SYSTEM AND METHOD

[76] Inventors: Gary L. Aderholt, R.R. 14, Box 132; Michael A. Lenox, R.R. 14, Box 132-A, both of Athens, Ala. 35611

[21] Appl. No.: 318,223

[22] Filed: Mar. 2, 1989

[51] Int. Cl.$^5$ ............................................. G01F 23/28
[52] U.S. Cl. ..................... 73/290 V; 367/108; 367/908; 340/621; 364/509; 364/564
[58] Field of Search ............. 73/290 V; 367/108, 908; 181/123, 124, 400, 402; 340/621; 364/509, 562, 564

[56] References Cited

U.S. PATENT DOCUMENTS

| | | | |
|---|---|---|---|
| 2,713,263 | 7/1955 | Turner | 367/908 |
| 2,787,160 | 4/1957 | Van Valkenburg | 73/290 V |
| 2,869,108 | 1/1959 | Smith, Jr. | 73/290 V |
| 2,998,723 | 9/1961 | Smith, Jr. et al. | 73/290 V |
| 3,010,318 | 11/1961 | Mongan | 73/290 V |
| 3,113,456 | 12/1963 | Smith, Jr. et al. | 73/290 V |
| 3,184,968 | 5/1965 | Werner | 73/290 V |
| 3,214,974 | 11/1965 | Altman et al. | 73/290 V |
| 3,290,944 | 12/1966 | Altman et al. | 73/290 V |
| 3,394,589 | 7/1968 | Tomioka | 73/290 V |
| 3,745,829 | 7/1973 | Franchi | 73/290 V |
| 3,834,233 | 9/1974 | Willis et al. | 73/290 V |
| 4,145,914 | 3/1979 | Newman | 367/108 |
| 4,170,765 | 10/1979 | Austin et al. | 367/108 |
| 4,210,969 | 7/1980 | Massa | 73/290 V |
| 4,470,299 | 9/1984 | Soltz | 73/290 V |
| 4,487,065 | 12/1984 | Carlin et al. | 73/290 V |
| 4,531,406 | 7/1985 | Fritz | 73/290 V |
| 4,572,253 | 2/1986 | Farmer et al. | 367/108 |
| 4,748,846 | 6/1988 | Haynes | 73/290 V |
| 4,805,453 | 2/1989 | Haynes | 73/292 |
| 4,841,770 | 6/1989 | Davies | 73/290 V |

FOREIGN PATENT DOCUMENTS

| | | | |
|---|---|---|---|
| 52-53443 | 4/1977 | Japan | 73/290 V |
| 55-160818 | 12/1980 | Japan | 73/290 V |
| 56-46429 | 4/1981 | Japan | 73/290 V |
| 821939 | 4/1981 | U.S.S.R. | 73/290 V |

Primary Examiner—William A. Cuchlinski, Jr.
Assistant Examiner—Diego F. F. Gutierrez
Attorney, Agent, or Firm—Kirkpatrick & Lockhart

[57] ABSTRACT

A system for measuring the level of a fluid in a tank comprises a plurality of reflectors positioned in the tank with the reflectors being a known distance from one another and a first reflector being an unknown distance from the top of the tank and an apparatus for producing and outputting a sonic signal and for receiving echoes from the plurality of reflectors and a surface of the fluid in the tank. The apparatus produces electrical signals representative of the received echoes. The apparatus includes a processor responsive to the electrical signals for, (i) calculating the distance between the apparatus and the first reflector, (ii) calculating the distance between a last reflector and the fluid surface, and (iii) determining the total distance from the apparatus to the fluid surface based on the distances calculated in (i), (ii), and the distance between the first and last reflectors.

29 Claims, 7 Drawing Sheets

SONIC TANK INVENTORY CONTROL SYSTEM AND METHOD

BACKGROUND OF THE INVENTION

1. Field of the Invention

The present invention is directed generally to tank inventory control systems and more particularly to inventory control systems using ultrasonic measuring devices.

2. Description of the Prior Art

Whenever fluids are stored in a tank, the need arises to accurately determine the volume of fluid in the tank. Currently, the normal practice at sites storing Class I liquids (gasoline and diesel), is to measure the amount of fluid or product in the tanks from one to three times per day. The current standard method of assessing tank inventory levels makes use of a wooden stick, known as a "tankstick," which is dipped into the tank to measure the height of the product in the tank, in inches. Obviously, with that method of measurement, the reading, recording, and converting to gallons must all be done manually. That provides too much opportunity for human error. Totalizers (on the gas pumps or an electronic console) are also read manually and the volume dispensed is computed from the previous reading. Those readings are used to provide an inventory reconciliation for the period since the last readings. That short term balance must be stored and later combined with other short term balances to see if a long term trend shows a loss of product through a possible leak. The potential for human error is significant, resulting in inaccurate totals or loss of records. Simple neglect in following the proper procedures is also a common problem.

Shortcomings of the current method are numerous and include such considerations as: the tankstick is cumbersome, usually twelve to sixteen feet long; when the stick is removed, there may be product as high as ten feet up from the bottom of the stick and there is no way the attendant can keep product from getting on his hands; attendants commonly use some powder, like baby powder, on the stick to make it easier to read, which adds impurities to the product; and the attendant must carry the stick, something to write on, something to write with, and still have a free hand to get the cap off the tank fill pipe.

The stick's accuracy is normally plus or minus one-fourth inch. In a typical size tank, that translates to an accuracy of plus or minus fifty gallons. The accuracy of such measurements further suffers from the following problems: dropping the stick into the tank eventually causes a dent in the bottom of the tank, which adds to any inaccuracies; product can splash up on the stick causing false readings; most sticks are wood, and older sticks are porous enough that the product wicks up the stick giving erroneous data; in dry areas, the lighter petroleum products, like gasoline, immediately start to evaporate from the stick making accurate readings impossible; the end wears off the stick with use, making all readings inaccurate; and the stick is stored outside, usually leaning up against the building, causing it to warp.

The need for more accurate measurements of fluids in underground tanks has been recognized in the art. For example, U.S. Pat. No. 3,394,589 discloses an Apparatus For Measuring Liquid Level. The apparatus may be used, for example, in conjunction with measuring a liquid level in a tank. The apparatus utilizes an electro-acoustic transducer that produces a sound wave directed toward the surface of the liquid along a sound wave guide path. A plurality of reflection elements located at fixed distances from the transducer are associated with the guide path. The sound wave progresses through the sound wave guide towards the liquid surface. As the sound wave progresses downwardly towards the liquid surface, it is partially reflected by the reflection elements. Upon reaching the liquid surface, the sound wave is again reflected. The reflected sound waves are detected by the transducer which produces electrical signals in response to the detection of each wave. An oscillator provides a given number of cycles, or pulses, between the reflection time from a pair of reflectors; by counting the number of pulses, a measure of the liquid level between reflectors can be obtained.

U.S. Pat. No. 4,210,969 discloses a sonic ranging system designed to eliminate the errors due to variations in the sound velocity in the medium above the liquid to be detected in a storage tank. An electro-acoustic transducer is provided with a mounting flange which is used for attaching the transducer to an opening at the top of the storage tank. The transducer is provided with an extending L-shaped rod member which is rigidly attached to the transducer housing structure. A small disk which acts as a sound reflecting target is rigidly attached to the rod so that the flat surface of the target is located perpendicular to the axis of the transducer. The position of the target reflecting surface is fixed at a precise distance from the transducer. The function of the reflecting target is to provide a self-calibrating means for automatically correcting for errors in the measurement of the distance from the transducer to the surface of the liquid which would otherwise occur as a result of variations of the velocity of sound in the air space above the liquid.

The directional sound beam generated by the transducer travels along two paths. The sound beam travelling along one path is reflected from the target and is returned to the transducer while, at the same time, the sound beam travelling along the other path is reflected from the liquid surface and is returned to the transducer at a later time. Counters measure the time between the transmission and the reception of each of the signals. The ratio of the two times as measured by those counters is determined and then multiplied by the known distance between the reflector target and the transducer to determine the distance between the transducer and the surface of the liquid.

Another example of an ultrasonic liquid level meter is disclosed in U.S. Pat. No. 4,470,299. That patent discloses an ultrasonic transducer mounted above a storage tank at a fixed distance from the bottom of the tank. A reflector is also placed at a fixed distance from the transducer. Transmitted energy is propagated through the gaseous medium between the transducer and the liquid surface and is directed both toward the reflector surface and the surface of the liquid. The sound waves are reflected from both surfaces and returned to the transducer which now acts as a detector and whose output is coupled to a receiver.

Each transmitted pulse is followed by a reference echo pulse which corresponds to the receipt of the sound wave reflected from the fixed reflector. The reference echo pulse is followed by a main pulse which corresponds to the receipt of the sound wave reflected from the liquid surface. A clock is started coincident with the transmission of a pulse and stopped when the reference echo pulse is received. The number of clock pulses in that period provides a count representing the reference transit time. A similar clock arrangement provides a count representing the transit time to the liquid surface level. The counts are applied to a microprocessor to yield an output count representing the level of the liquid independent of environmental changes.

Such ultrasonic liquid level measurement devices may be used in conjunction with tank inventory and or tank control systems. For example, in U.S. Pat. No. 4,487,065 a system using ultrasonic transducers is disclosed which is capable of providing history reports including tank levels, failure rates, size of tank, etc., user logs, daily gauge reports, tank level reports, user information reports, and lease run tickets.

The need for accurate tank measurements has been heightened recently due to environmental considerations. For many years the Environmental Protection Agency (EPA) has been concerned that leakage from underground storage tanks (especially those containing gasoline and diesel fuel) is contaminating the water table in many parts of our country. The problem is a serious one with damage estimates of fifty-five billion dollars over the next thirty years. Permanent damage to our drinking water supply is a matter that the EPA felt it had to address.

On Sept. 23, 1988, the EPA promulgated final regulations that will affect all owners and operators of underground storage tanks containing petroleum products and other regulated substances. With only limited exceptions, the EPA has issued a basic regulatory directive for the approximately two million underground storage systems in operation today. The new rules address every aspect of the life cycle of an underground storage tank system, i.e. design, construction, installation, upgrading of existing systems, operation and maintenance, cleanup, and closure. These technical requirements, which affect both new and existing underground storage tanks, are directed to three different areas, leak detection, corrosion prevention, and spill/overfill prevention.

All existing underground storage tank systems will be required to achieve required levels of leak detection, corrosion protection, and spill/overfill prevention. The EPA has established schedules for achieving those goals based, in part, on the age of the tank as of the effective date of the final regulations. All existing tanks will be required to have leak detection systems or one of the following three alternatives: (i) monthly monitoring; (ii) monthly inventory control and annual tank tightness testing; or (iii) monthly inventory control and tank tightness testing every five years for tanks with corrosion protection and spill/overfill prevention.

Thus, in view of the need for accurate tank measurement systems, which need has been heightened by EPA regulations, the need exists for a tank level measurement system for providing accurate measurements of fluid levels in tanks. The need also exists for a system for automatically calculating tank volumes based on the measured liquid level. The need also exists for a system capable of performing inventory control functions which can be used for various purposes such as managing inventory or satisfying EPA requirements. The need exists for a system which is inexpensive and which can be installed in existing tanks. The system should be flexible so that it can be used with various tank configurations and should not suffer from the shortcomings found in the prior art.

SUMMARY OF THE PRESENT INVENTION

The present invention is directed to a system for measuring the level of a fluid in a tank and comprises a plurality of reflectors positioned in the tank with the reflectors being a known distance from one another and a first reflector being an unknown distance from the top of the tank, and an apparatus for producing and outputting a sonic signal and for receiving echoes from the plurality of reflectors and a surface of the fluid in the tank. The apparatus produces electrical signals representative of the received echoes. The apparatus includes a processor responsive to the electrical signals for, (i) calculating the distance between the apparatus and the first reflector, (ii) calculating the distance between a last reflector and the fluid surface, and (iii) determining the total distance from the apparatus to the fluid surface based on the distances calculated in (i), (ii), and the distance between the first and last reflectors.

According to one embodiment of the present invention, the plurality of reflectors takes the form of a reflector ladder positioned in the fill pipe of a tank. In such an embodiment, the apparatus is capable of being coupled to the fill pipe. The apparatus may be portable such that a single apparatus may be used in conjunction with various different tanks each having its own reflector ladder. In such an embodiment, an additional reflector may be carried by the reflector ladder to specifically identify the tank in which the reflector ladder is positioned.

The system of the present invention provides many advantages not found in the prior art. Because the apparatus may be used in conjunction with reflectors positioned an unknown distance from the top of the tank, the device may be made portable so that it may be used with other tanks. Further, that ability allows tanks to be fitted on site with reflector ladders without undue concern regarding the distance of the first reflector from the top of the tank. Additionally, because one apparatus may be used with several tanks each having its own reflector ladder, the cost of the overall system for a user having several tanks is reduced. The apparatus's ability to specifically identify the tank with which it is being used based on the position of additional reflectors on the reflector ladder eliminates the possibility of user error.

The present invention is also directed to a portable apparatus for measuring the level of a fluid in a tank. The apparatus is intended for use with a plurality of reflectors positioned in the tank an unknown distance from the apparatus. The apparatus comprises means for producing an output signal. A transducer is responsive to the output signal for outputting a sonic signal and for producing input signals in response to echoes from the plurality of reflectors and a surface of the fluid in the tank. A processor is responsive to the input signals for (i) calculating the distance between the apparatus and the first reflector, (ii) calculating the distance between the last reflector and the fluid surface, and (iii) determining the total distance from the apparatus to the fluid surface based on the distances calculated in (i), (ii), and the distance between the first and last reflectors.

According to one embodiment of the apparatus, the means for producing an output signal includes means for producing a first output signal having a first frequency and a second output signal having a second frequency, and wherein the processor determines the leading edge of an echo based on the difference in arrival times of subsequent cycles of echoes resulting from the first and second output signals.

According to another embodiment of the apparatus, the means for producing an output signal includes means for producing an output signal of varying frequency, and wherein the processor compares the pattern of frequency changes of the received echoes to the original pattern of frequency changes to determine the leading edge of the echoes.

According to another embodiment of the apparatus, the apparatus additionally comprises a memory device for storing information about the tank, and wherein the processor calculates the volume of fluid in the tank based on the calculated total distance from the apparatus to the surface of the fluid and the stored information.

According to another embodiment of the apparatus, the apparatus may also store the calculated volume. The apparatus additionally comprises a key pad or other input device for inputting information regarding fluid removal or other pertinent information. The processor is responsive to the stored volume information and the input information to perform inventory control functions.

The apparatus of the present invention provides several advantages over the prior art. The use of either two output signals of different frequencies or a single output signal of varying frequency enables the apparatus to precisely determine the leading edge of each of the received echoes. That enables the apparatus of the present invention to achieve the desired accuracy. By providing the apparatus with a memory for storing various calculations together with a key pad or other devices for inputting information, the apparatus of the present invention can automatically perform various inventory functions. Such functions may include reconciling tank volume with the volume of product removed from the tank for inventory control purposes or for purposes of determining leaks. When the apparatus of the present invention is used in a system as previously described having a ladder with reflectors that automatically identify the tank with which the portable device is being used, the entire process of taking readings for a given tank, storing those readings over a period of time, and performing inventory functions with the stored readings is entirely automated thereby eliminating the possibility of human error.

The present invention is also directed to a reflector ladder for reflecting sonic signals. The ladder comprises a central support, a plurality of reflectors carried by the support and positioned a known distance from one another, and at least one additional reflector carried by the support and positioned to uniquely identify the reflector ladder.

The present invention is also directed to a method of measuring the level of a fluid in a tank having a plurality of reflectors positioned therein an unknown distance from the top of the tank. The method is comprised of the following steps: outputting a sonic signal into the tank; producing input signals in response to echoes from the plurality of reflectors and a surface of the fluid in the tank; calculating the distance between the top of the tank and the first reflector; calculating the distance between the last reflector and the fluid surface; and determining the total distance from the top of the tank to the fluid surface based on the distances calculated in (i), (ii), and the distance between the first and last reflectors.

The system and method of the present invention, and the component parts of the system (the apparatus and ladder) provide substantial advances over the prior art as previously identified. Because the apparatus can be used with a ladder having a first reflector an unknown distance from the top of the tank, tanks may be fit with reflector ladders without undue concern for the positioning of such ladders. Additionally, the apparatus may be made portable so that it can be used with a plurality of tanks. By positioning a reflector on the reflector ladder to specifically identify individual tanks, various inventory control procedures can be automatically performed thereby eliminating the possibility of human error. Additionally, the system and method of the present invention provide an inexpensive mechanism to enable compliance with new EPA regulations. Those and other advantages and benefits of the present invention will become apparent from the description of a preferred embodiment herein below.

BRIEF DESCRIPTION OF THE DRAWINGS

In order that the present invention may be clearly understood and readily practiced, preferred embodiments will now be described, by way of example only, with reference to the accompanying figures wherein.

DESCRIPTION OF A PREFERRED EMBODIMENT

Figure 1:
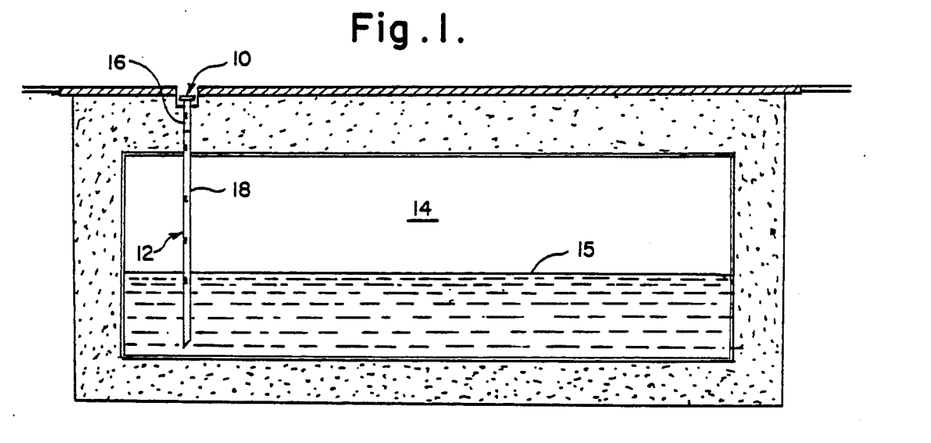
FIG. 1 illustrates an underground tank having the reflector ladder of the present invention positioned in the drop tube and the measurement apparatus of the present invention positioned on top of the fill pipe.

The present invention is directed to a system for measuring the level of a liquid in a tank and is comprised of two components. The first component is a measuring apparatus 10 seen best in FIGS. 2, 3, 4, and 5. The second component of the system is a reflector ladder 12 seen best in FIGS. 6, 7, and 8. The system of the present invention will be described in conjunction with an underground tank 14 illustrated in FIG. 1. Although the present invention will be described in connection with the underground tank 14, it is understood that the principles of the present invention are equally applicable to above ground tanks and may also be applied to other types of enclosed vessels.

Figure 2:
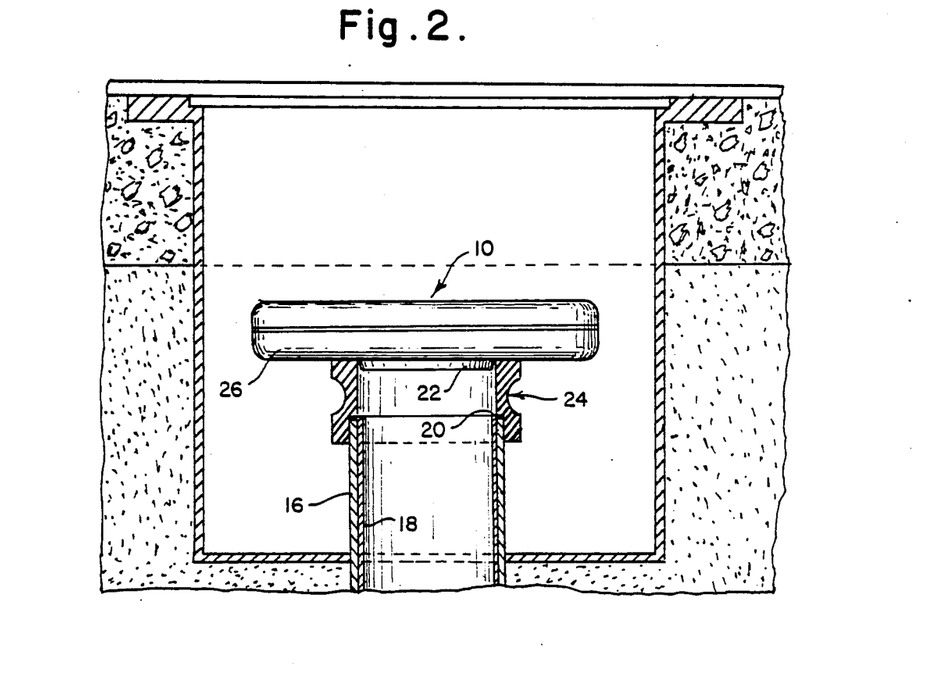
FIG. 2 illustrates the details of the coupling of the measurement apparatus of the present invention to the fill pipe.

The underground tank 14 is provided with a fill pipe 16 which is used to add fluid to the tank 14. The system of the present invention requires that the drop tube 18 extend substantially to the bottom of the tank. As seen in FIG. 2, the drop tube 18 has an outside diameter substantially the same as the inside diameter of the fill pipe and has a flange 20 formed at one end thereof which supports the drop tube 18 within the fill pipe 16.

Figure 4:
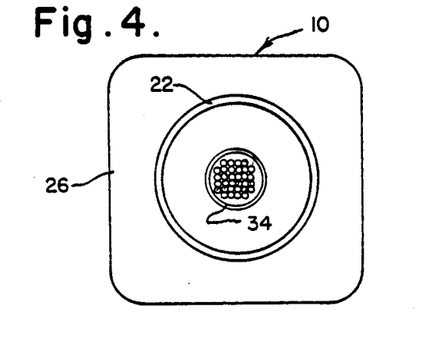
Figure 5:
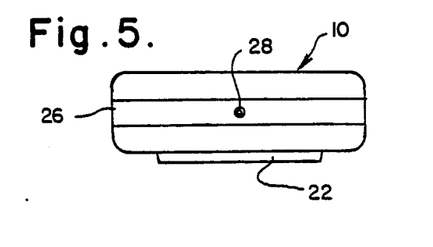

The measurement apparatus 10 is provided with a mounting ring 22 seen best in FIGS. 2, 4, and 5. The mounting ring 22 may be configured so that the measurement apparatus 10 mates with the flange 20 of the drop tube 18. Alternatively, a fill pipe adaptor 24, illustrated in FIG. 2, may be provided for coupling the apparatus 10 to the fill pipe 16.

Figure 3:
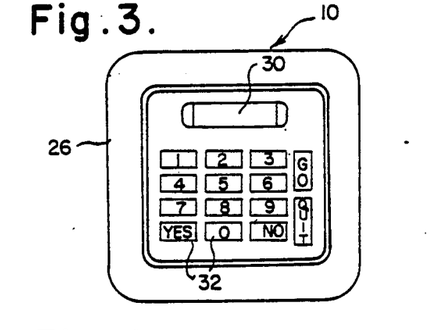
FIGS. 3, 4, and 5 illustrate top, bottom, and side views, respectively, of the measurement apparatus of the present invention.

The measurement apparatus 10 may be constructed as a portable hand held device as shown in FIGS. 3, 4, and 5. The apparatus 10 may include a dust-tight plastic case 26 which is impervious to gasoline and other solvents which may be prevalent in certain environments. The measurement apparatus 10 may be powered by rechargeable batteries (not shown) and a socket 28 may be provided for recharging the batteries without removing same from the apparatus 10. Data may be displayed on a LCD display 30 which may take the form of a sixteen character by two line display. The display 30 may be provided with backlighting for low-light situations. User control and the ability to input data to the measurement apparatus 10 may be provided through a key pad 32 having customized legends. The underside of the measurement apparatus 10 seen in FIG. 4 will carry a sonic transducer 34 centered within the mounting ring 22.

Figure 6:
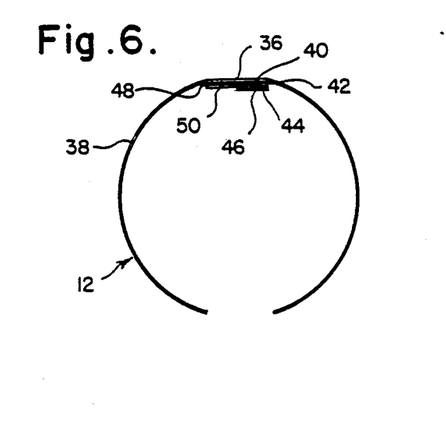
FIGS. 6, 7, and 8 illustrate top, front, and side views, respectively, of the reflector ladder of the present invention.
Figure 7:
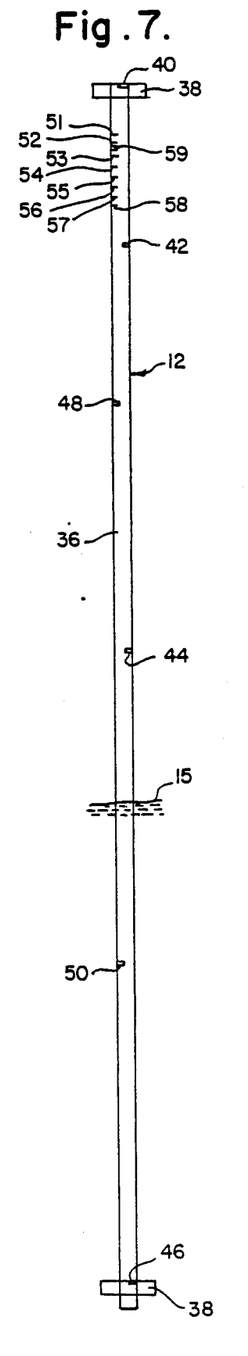
Figure 8:
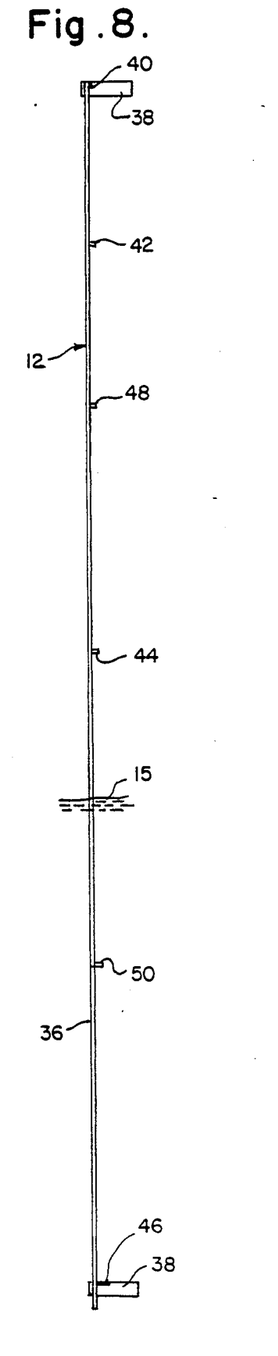

The other component of the present invention is the reflector ladder 12 seen best in FIGS. 6, 7, and 8. The reflector ladder 12 is comprised of a central support or spine 36. The central support 36 carries attachment devices 38 at both ends thereof which may take the form of circular springs as seen best in FIG. 6. The attachment devices 38 are sized so as to fit within the drop tube 18 and firmly hold the reflector ladder 12 in place. By virtue of the construction of the reflector ladder 12, ladder 12 may be easily installed within drop tubes 18 in existing tanks.

The central support 36 of the reflector ladder 12 carries a plurality of horizontal reflectors which may range in size from one-fourth inch by one-fourth inch to one-half inch by three-fourth inch. The reflectors may be positioned along the ladder at intervals ranging from twelve to twenty-four inches. As seen in FIG. 7, which is a frontal view of the reflector ladder 12, the reflectors are arranged so that reflectors 40, 42, 44, and 46 are positioned on the right side of the central support 36 as viewed in FIG. 7 while reflectors 48 and 50 are positioned on the left side of the central support 36. As you move further down the reflector ladder 12 from the top to the bottom, each subsequent reflector extends further out from the support 36 as seen best in FIG. 8. That constant increase in size from one reflector to the next creates a "stepped" effect when the reflector ladder 12 is viewed from the top as shown in FIG. 6.

The reflector ladder 12 additionally carries another reflector 59 which is carried in one of the positions 51 through 58 between the first reflector 40 and second reflector 42. The position 51 through 58 in which the additional reflector is carried provides information to the measurement apparatus 10 for particularly identifying the tank in which the reflector ladder 12 is positioned. Thus, when the measurement apparatus 10 is made portable, the apparatus 10 can automatically determine the tank with which it is being used thereby eliminating the possibility of operator error.

The positions of the reflectors 40, 42, 44, 46, 48, and 50 with respect to one another on the reflector ladder 12 must be accurate. However, the position of the reflector ladder 12 within the drop tube 18 is constrained only by the fact that the two uppermost reflectors 40 and 42 must be above the level of the top of the tank and some minimal distance down from the top the drop tube 18. Given the typical length of a fill pipe 16, that will allow approximately eighteen inches of play in the positioning of the reflector ladder 12 at most sites. For that reason, the reflector ladder 12 may be installed in existing tanks without undue regard with respect to its position within the drop tube 18. That makes installation easier, quicker, and less expensive.

Figure 9:
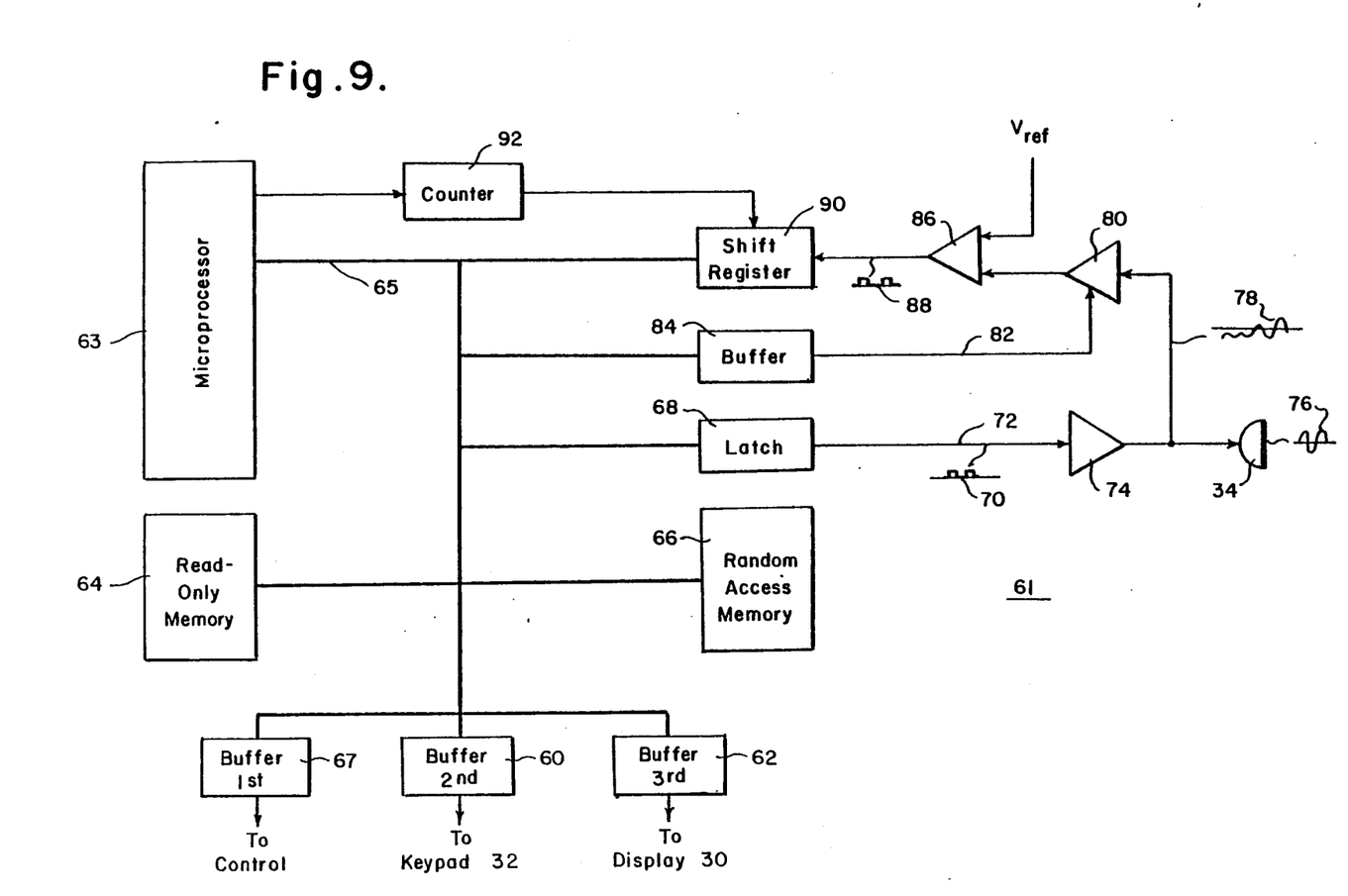
FIG. 9 is a block diagram illustrating the electronics carried by the measurement apparatus of the present invention.

In FIG. 9, a block diagram illustrating the electronics 61 carried by the measurement apparatus 10 is shown. The electronics 61 is comprised of a microprocessor 63 interconnected through a data/address bus 65 to a first buffer 67, a second buffer 60, and a third buffer 62. The buffers may be used to interface with an external device, the key pad 32, and the display 30, respectively. Also connected to the bus 65 is a read only memory 64 which contains the program for the microprocessor 63 and a random access memory 66 which is used to store variable data such as tank configuration parameters and measurement results.

Figure 10A:
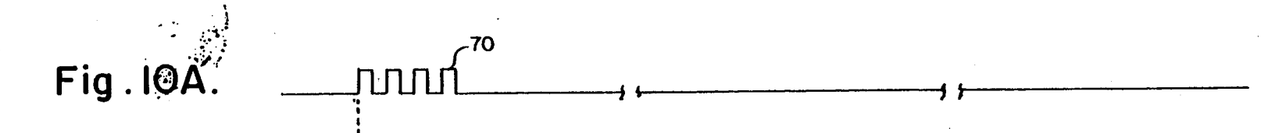
FIGS. 10A through 10D illustrate various signals produce by the electronics illustrated in FIG. 9.
Figure 10B:
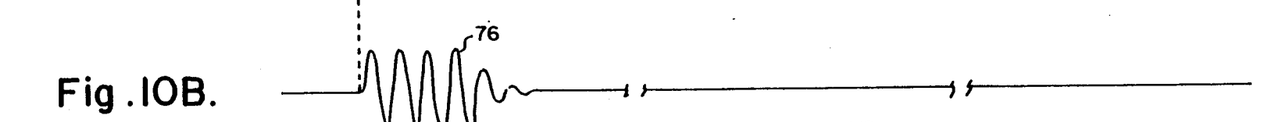

A latch 68 is under the control of the microprocessor 63 through the bus 65 to toggle a line 72 to produce a square-wave burst output signal 70. The output signal 70, which is shown in detail in FIG. 10A, is amplified by an amplifier 74 and input to the transducer 34. The mechanical characteristics of the transducer 34 are such as to produce a sonic signal 76, shown in FIG. 10B, which is nearly sinusoidal even though the output signal 70 is a square wave. The sonic signal 76 is output to the drop tube 18 and propagates down the tube.

Figure 10C:
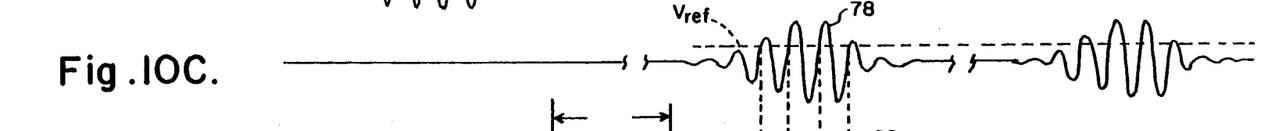

As the sonic signal 76 is reflected by the reflectors 40, 42, 44, 46, 48, and 50, by the surface of the fluid in the tank 14, and by the bottom of the tank, echoes are produced which are sensed by the transducer 34. In response to the sensed echoes, electrical input signals 78 are produced which are shown in FIG. 10C.

Figure 10D:
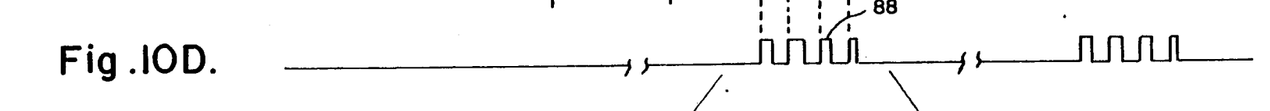

A receiver amplifier 80 is connected to the transducer 34. The amplifier 80 amplifies any signal present on the transducer terminals (including the amplified output signal 70). The gain on the amplifier 80 is determined by a binary value set on a group of lines 82 by the microprocessor 63 through a buffer 84. The output of the amplifier 80 drives the input of a comparator circuit 86. The comparator circuit 86 receives a reference signal which it uses as a threshold value $V_{ref}$. The threshold value $V_{ref}$ is set just above the level of receiver amplifier 80 noise. An output signal 88 from the comparator circuit 86, seen best in FIG. 10D, is a digital signal which is in a high state only when the positive half-cycle of an input signal 78 is above the comparator threshold $V_{ref}$. Thus, the comparator 86 digitizes the input signals 78.

Figure 11:
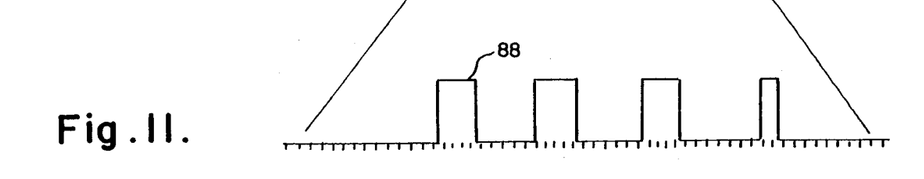
FIG. 11 is an enlarged view of a portion of the digitized input signal shown in FIG. 10D.
Figure 12:
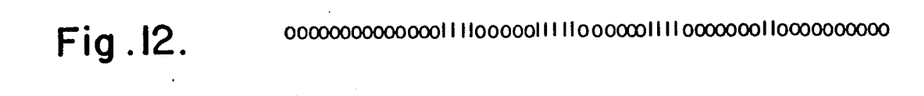
FIG. 12 illustrates a data stream which is a digital representation of the portion of the signal shown in FIG. 11.

A shift register 90 is used to sample the digital signal 88 at a rate that is some multiple of the microprocessor's clock (not shown). That rate is determined by the configuration of a dividing counter 92. Each time the shift register 90 samples the signal 88, the signal 88 will either be in a low state in which case a zero is stored in the shift register 90 or the signal 88 will be in a high state in which case a one will be stored in the shift register 90. In that manner, the signal 88 shown enlarged in FIG. 11, is converted into a data stream of zeros and ones as shown in FIG. 12. That data stream can be read by the microprocessor 63 through the bus 65 at any time.

OPERATION OF THE PRESENT INVENTION

I. General Description

In operation, the taking of a measurement is performed under the total control of the microprocessor 63. The design of the electronics 61 maximizes the use of the microprocessor 63 while minimizing the need for costly peripheral components.

Figure 13:
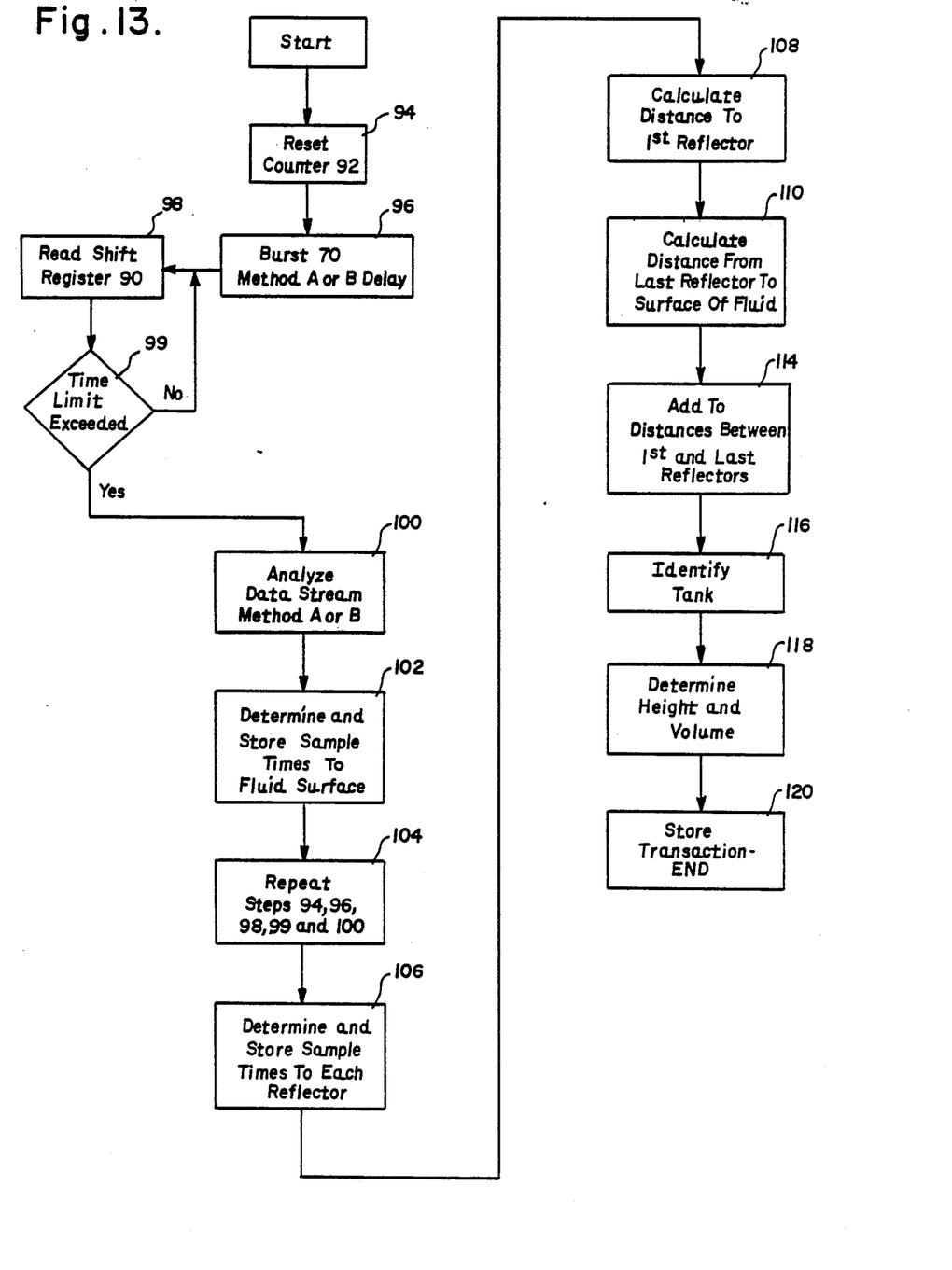
FIG. 13 is a flow chart illustrating the sequence of operations carried out by the microprocessor illustrated in FIG. 9.

The sequence of operations carried out by the electronics 61 is illustrated in FIG. 13. In FIG. 13, the microprocessor 63 starts the measurement process by resetting the counter 92 at step 94. The counter 92 drives the clock of the shift register 90. Resetting the counter 92 synchronizes the state of the counter with the microprocessor software.

At step 96, the microprocessor 63 toggles an output bit on the latch 68 to produce the output burst 70 which is amplified and input to the transducer 34. The square wave output signal 70 produced on the line 72 may be "customized" to achieve a better shaped burst which is more efficient and easier to detect. That customizing might involve changing the duty cycle of each cycle in the burst or changing the frequency slightly from cycle to cycle. It may involve generating a pulse or pulses that are timed to stop the transducer from ringing once the desired burst has been generated. All of those options are possible because the line driving the transducer 34 is ultimately controlled by the microprocessor 63 instead of by a free-running oscillator. Two different methods of generating an output burst 70 are described in detail hereinbelow in conjunction with that portion of the specification entitled Burst Production and Echo Detection.

The ultrasonic signal 76 produced by the transducer 34 travels down the drop tube 18 towards the surface of the fluid. As it encounters each reflector on the reflector ladder 12, it is partially reflected upward. Most of the sonic signal 76 reaches the fluid and is reflected upward therefrom. What reaches the transducer 34 is a series of echoes, one echo from each reflector that is above the surface of the fluid, one echo from the surface of the fluid, and possibly other inconsequential echoes from multiple reflections.

At the beginning of the measurement process, as the sonic signal 76 begins to travel down the drop tube 18, the microprocessor 63 delays the routine for a predetermined period of time. After that delay, the microprocessor 63 begins to read data at step 98 from the shift register 90 at fixed intervals. Because the counter 92 driving the clock of the shift register 90 has been synchronized with the software of the microprocessor 63, the point at which the shift register 90 is read initially and the interval between readings can be controlled by the software so that the shift register is read only when it is full. In other words, the software knows precisely when the shift register 90 will be filled with eight bits and reads the shift register at that instant so that no data is lost or overlapped. That is possible because the shift register 90 and the processor 63 are driven from the same clock thus rendering the whole data gathering process synchronous. Because the data is read synchronously, the electronics 61 is kept simple and inexpensive.

The data is read from the shift register 90 by the microprocessor 63 and the results are stored in the random access memory 66 to produce a data stream in the memory 66. The data gathering process continues for a time that is long enough to ensure that echoes from the lowest point in the tank have returned and have been recorded as represented by step 99.

The end result of the data gathering function of step 98 is a stream of binary digits as shown in FIG. 12 stored in the random access memory 66 which represents all of the echoes received by the transducer 34. Because the process is synchronous, each bit or sample represents the state of the received data at a particular point in time after the burst 70 was transmitted from the transducer 34. It is a simple matter to determine the time between events by counting the bits or sample times between the events and multiplying the count by the proper time value, which may be, for example, 1.6 microseconds.

When the data stream has been stored in the random access memory 66, the processor begins the task of analyzing the data stream at step 100. The purpose of the analysis of step 100 is to determine the amount of time between the instant the leading edge of the burst 76 left transducer 34 and the point in time when the leading edge of the echo was received by transducer 34. Difficulties arise in determining exactly where the leading edge of the echo is. Two methods of analyzing the data stream to determine the leading edge of the echo, which correspond to the two methods of producing bursts 70, are described hereinbelow in conjunction with that portion of the specification entitled Burst Production and Echo Detection.

The process performed by the measurement apparatus 10 involves making two sets of measurements. The first measurement is to determine the number of sample times it takes for the sonic signal 78 to travel from the transducer 34 to the surface of the fluid in the tank and back again as set forth in step 102. In making that measurement, the gain of the receiver amplifier 80 is kept at a relatively low level. As time passes, the microprocessor 63 periodically increases the gain of the receiver amplifier 80 by means of the control lines 82. That is necessary because, as time passes, the received signals are attenuated more and more due to their longer path of travel. To compensate for that attenuation, the processor 63 steps up the gain of the amplifier 80 at predetermined points in time. However, the gain is kept sufficiently low such that all other echoes except those from the surface of the fluid are input to the comparator 86 at a level below the threshold value $V_{ref}$. The comparator 86 thus does not respond to those echoes and only responds by creating a series of ones when the echo from the fluid surface is received. After the number of sample times has been determined and stored, the processor continues at step 104.

In step 104, steps 94, 96, 98, 99, and 100 are repeated. The purpose of repeating those steps is to produce and store a data stream representative of the echoes produced by the reflectors carried by the reflector ladder 12. While the data is being read at step 98, the gain of the receiver amplifier 80 is set to a sufficient level to ensure that all reflector echoes will be detected by the comparator 86.

Although the present invention is described in conjunction with the taking of two sets of measurements by repeating steps 94, 96, 98, 99, and 100, it is anticipated that all of the necessary measurements may be taken in response to one step 96 by properly setting the gain of the receiver amplifier 80.

After the data stream representative of the echoes produced by the reflector ladder 12 has been analyzed, the microprocessor 63 determines at step 106 the number of sample times between the transducer 34 and the reflectors. The number of sample times is obtained by simply counting the number of zeros until a one is reached which represents the leading edge of the echo produced by a reflector. When the number of sample times to each reflector is determined, the number of sample times between reflectors can be determined.

Once the number of sample times between the transducer 34 and the first reflector 40, and the number of sample times between the first reflector 40 and second reflector 42 have been determined, the actual distance from the transducer 34 to the first reflector 40 can be computed according to the following equation:

$$D1 = (S1 \times D2)/S2$$

where

D1 is the distance to the first reflector;

S1 is the number of samples between the transducer 34 and the first reflector 40;

D2 is the known distance between the first reflector 40 and the second reflector 42; and S2 is the number of samples between the first reflector 40 and the second reflector 42.

After the distance between the transducer 34 and the first reflector 40 is calculated at step 108, that value is stored for future use. The above equation may be modified to incorporate the number of samples between reflectors 42, 44, 46, 48 and 50 along with the distances between these reflectors 42, 44, 46, 48 and 50 to increase the accuracy of the calculation.

At step 110, it is now necessary to compute the number of sample times from the last detected reflector to the surface of the fluid in the tank. The phrase last detected reflector or simply the "last reflector" refers to that reflector which is closest to and above the surface of the fluid. With the level of fluid 15 illustrated in FIGS. 7 and 8, the last reflector is 44. Clearly, the determination of which reflector is the last reflector depends upon the level 15 of the fluid in the tank.

In step 110, the number of sample times from the transducer 34 to the last reflector 44 determined in step 106 is subtracted from the number of sample times from the transducer 34 to the surface of the fluid determined in step 102. That number of sample times represents the number of sample times from the last detected reflector to the surface of the fluid in the tank. Based on the number of sample times between the last reflector and the next to last reflector, the number of sample times between the last reflector and the surface of the fluid, and the known distance between the last reflector and the next to last reflector, the actual distance from the last reflector to the surface of the fluid can be calculated using the previously identified equation.

Preceding to step 114, at this time there is now a known value for the distance from the transducer 34 to the first reflector 40 and a known distance from the last detected reflector 44 to the surface of the fluid 15. Examination of the data stream identifies the number of reflectors between the first reflector 40 and last detected reflector 44. In step 114, the distances calculated in steps 108 and 110 are added together with the known distances between all of the intervening reflectors to determine the total distance from the transducer 34 to the surface of the fluid in the tank.

At step 116, the data stream is again analyzed to determine if a reflector was detected intermediate of the reflectors 40 and 42, and if so, at which position 51 through 58. Because the reflector associated with one of the positions 51 through 58 is unique for that particular reflector ladder 12 and tank, data peculiar to that tank can be retrieved from the read only memory 64. That data may include the total distance from the bottom of the tank to the point where the measurement apparatus 10 sits on the fill pipe 16 so that by subtracting the computed distance to the surface of the fluid from that value, the actual height of the fluid in the tank can be determined and stored at step 118.

Other data stored in the read only memory 64 may include tank configuration and dimensions so that the volume of the fluid in the tank can be determined based on the height of the fluid in the tank. That may be accomplished in the same way that station owners currently convert from height to volume except that the measurement apparatus 10 will do such conversions automatically and can interpolate between table entries if necessary. The measurement apparatus 10 may also take into account tank angle of inclination and other such variables to precisely determine the volume of the fluid in the tank. Such calculations are then stored in step 120 and the process is ended until further instructions are received from the user.

With volume information stored at step 120, various inventory functions can be performed. For example, consecutive volume readings may be taken and a difference in volume between the two readings determined. The user can then input information regarding the volume of fluid removed from the tank by using the key pad 32. If the volume of fluid removed from the tank does not correspond to the change in volume between the two readings, a leak may be indicated. Such precise measurements also provide an indication of when the tank needs to be refilled. All manner of conventional inventory procedures can now be automated thereby eliminating the possibility of human error.

II. Burst Production and Echo Detection

Figure 14A:
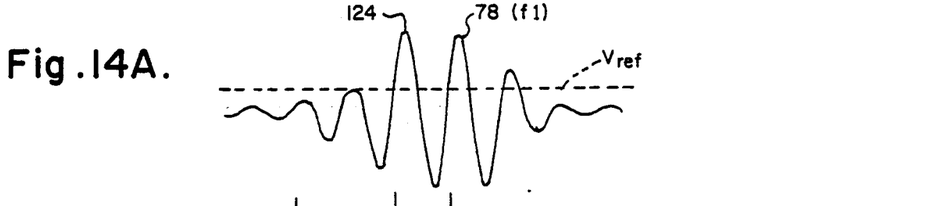
FIGS. 14A, 14B, 15A, and 15B illustrate signals that are helpful in understanding a first method of determining the leading edge of an echo.
Figure 14B:
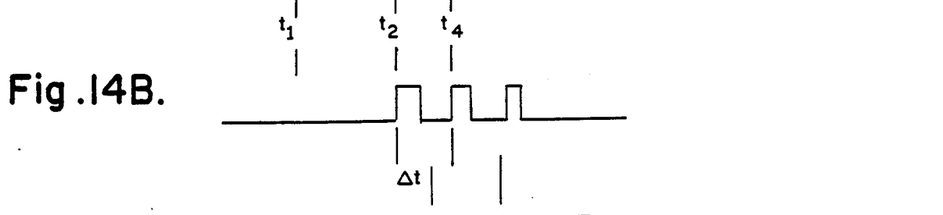

As discussed above, when the data stream is analyzed it is difficult to determine exactly where the leading edge of an echo is. The amplified signal 78 which is input to the comparator 86, is a substantially sinusoidal burst as shown in FIG. 14A. The leading and trailing edges are, however, damped significantly. Upon receiving the signal 78, a typical ultrasonic ranging device would conclude that the pulse was first received at time $t_2$ in FIG. 14A. That is the first point in time where the signal 78 rises above the input threshold $V_{ref}$ and the first point at which a pulse would be produced as shown by FIG. 14B. In actuality, the leading edge of the pulse occurred at time $t_1$. However, that leading edge was not detected because it was damped to a point where it did not exceed the threshold $V_{ref}$ of the comparator 86. Although this is an error of only one wavelength of the burst frequency, at a frequency of sixty kilohertz that amounts to an error of approximately one-fourth of an inch in the round trip travel of the sonic signal 76. Because the goal of this invention is an accuracy of better than one-tenth of an inch, it is necessary to be able to detect the leading edge which occurs at time $t_1$.

Figures 15A, 15B:
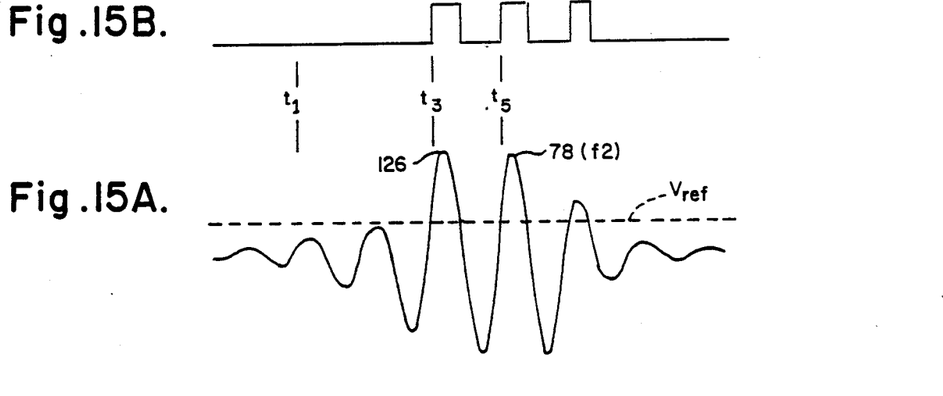
Figure 16:
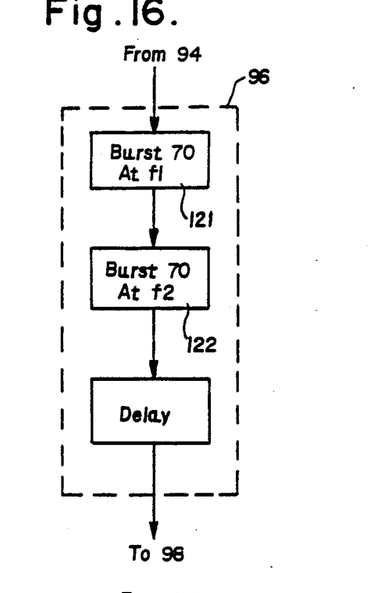
FIGS. 16 and 17 are flow charts illustrating the production of sonic signals used to produce echoes and the steps of a first method of determining the leading edges of those echoes, respectively.

A first method, Method A, for more accurately determining the leading edge of the pulses of input signal 78 involves sending two bursts of the output 70 in quick succession as shown in FIG. 16. Both bursts, represented by steps 121 and 122, are produced and transmitted by the electronics 61 as described above. The only difference is that the burst produced at step 122 is made up of cycles of a lower frequency f2 than the frequency f1 of the burst produced at step 121. The input signals 78 produced by each of those bursts are illustrated in FIGS. 14A and 15A. The digitized versions of each of those bursts are illustrated in FIGS. 14B and 15B, respectively.

Figure 17:
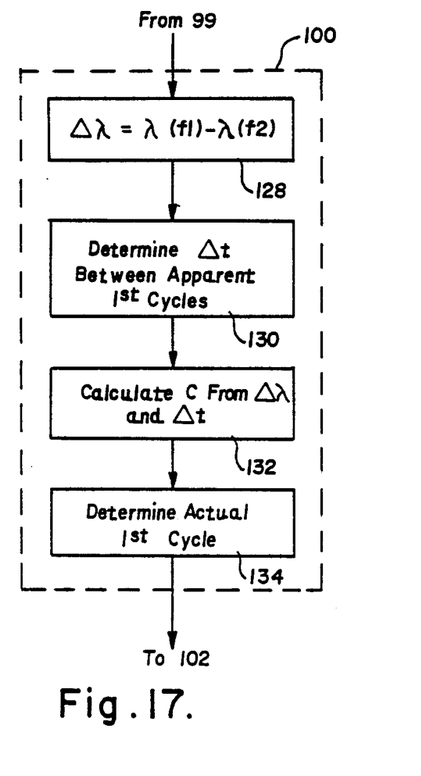

The steps needed to analyze the two signals illustrated in FIGS. 14B and 15B to get a single result are set forth in FIG. 17. To analyze the signals of FIGS. 14B and 15B, they must be viewed as though they were sent and received at different times. It is their relative travel times that are important. In reality, they may have been sent one right after the other or separated by some longer interval. In either case, the end result is the same.

The two bursts produced at steps 121 and 122 in FIG. 16 travel the same distance at the same speed, so their travel times are the same. The front edges of the two input signals 78 (f1) and 78 (f2) arrive at the same relative time $t_1$. What differs between the two is the time at which subsequent cycles arrive at the transducer 34. Because of the slower frequency, and therefore longer wavelength, the second cycle from the burst produced at step 122 arrives later than the second cycle from the burst produced at step 121. That time difference is a function of the speed of sound and the difference in the wavelengths between the two bursts. That time difference can be predicted by the following formula:

$$\Delta t = (\lambda(f1) - \lambda(f2))/c$$

where
(f1) is the wavelength of the burst produced at step 121;
$\lambda$(f2) is the wavelength of the burst produced at step 122; and
c is the nominal speed of sound.

If the difference in relative arrival times for the second cycles of each burst is given as $\Delta t$, the difference in arrival times for the third cycle of each will be two times $\Delta t$. That is true because the difference in wavelengths is cumulative for each successive cycle. Therefore, the formula for the difference in travel time for any two corresponding cycles of the two bursts is:

$$\Delta t = C \times (\lambda(f1) - \lambda(f2))/c$$

Where C is the zero-relative cycle number (first cycle is 0, second cycle is one etc.).

At this point, an assumption has to be made that the same numbered cycle in each burst will be the one which first exceeds the comparator threshold $V_{ref}$. In other words, if the third cycle 124 of the input signal 78 (f1) shown in FIG. 14A is the first one detected, then the third cycle 126 of the lower frequency input signal 78 (f2) shown in FIG. 15A will also be the first detected. That is a reasonable assumption if both bursts from steps 121 and 122 are transmitted in a like manner and the frequency difference is not too great.

Returning to FIG. 17, the value for $\Delta \lambda$ is calculated in step 128.

The digital data stream stored in the random access memory 66 is then analyzed so that the difference between the point in time $t_2$ when the first cycle of the input signal 78 (f1) is detected and the point in time $t_3$ when the first cycle of the input signal 78 (f2) is detected can be computed. That time difference ($\Delta t$) is then determined at step 130 by counting the sample times between times $t_2$ and $t_3$. Once $\Delta \lambda$ and $\Delta t$ have been determined, the previously provided equation can be solved for C. Once the cycle number is known, it is clear how many cycles of the burst were missed and a simple matter to count backwards to arrive at the true beginning of the burst. That is performed at step 134. Once the computed front end of the burst has been identified, all further computations are based on that computed front end.

Figure 18:
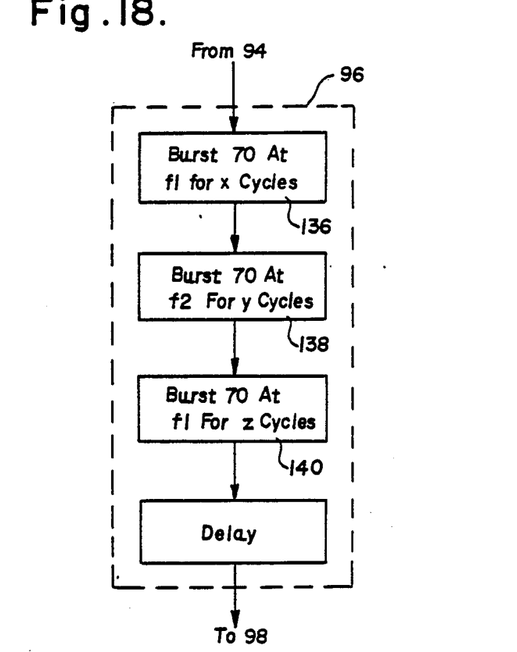
FIGS. 18 and 20 are flow charts illustrating the production of a sonic signal used to produce echoes and the steps of a second method of determining the leading edges of those echoes, respectively.
Figure 19A:
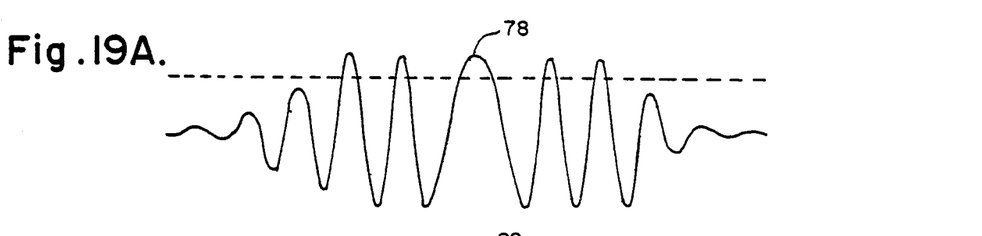
FIGS. 19A and 19B illustrate signals that are helpful in understanding a second method of determining the leading edge of an echo.
Figure 19B:
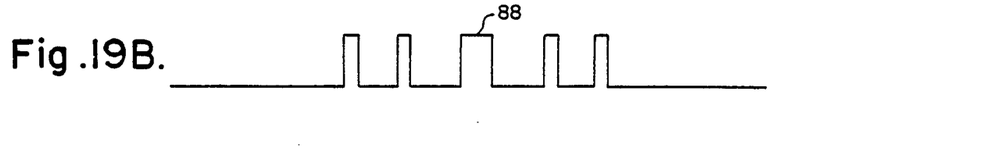
Figure 20:
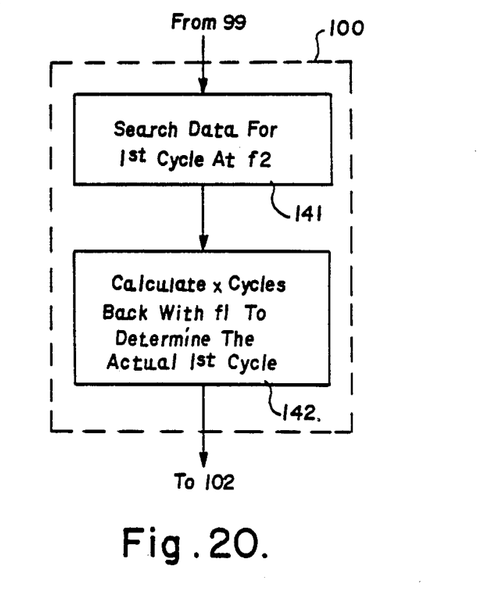

Another method of calculating the leading edge of the burst is disclosed in conjunction with FIG. 18 which illustrates burst Method B for step 96, FIGS. 19A and 19B which illustrate the input signal 78 and the digitized version 88 of the input signal 78, respectively, and FIG. 20 which illustrates the steps used to analyze those signals. While Method A involved the comparison of the phases of two separate bursts, Method B involves the comparison of signals produced by a single, highbred burst. The word highbred is used because the burst 70 that is transmitted is not a signal frequency but a mixture of several frequencies as shown in FIG. 18. At step 136, the transmitted burst consists of several cycles at frequency f1. As shown in steps 138 and 140, the burst 70 is then transmitted at a second and lower frequency f2 for y cycles and then ends with z cycles of the first frequency f1. The actual mix, however, is not important.

The echoes from the burst shown in FIG. 19A are received, amplified, and digitized to produce the signal shown in FIG. 19B. The signal shown in FIG. 19B is sampled as described above to produce a data stream which is stored in the random access memory 66.

In FIG. 20, the steps required to analyze the data are illustrated. The first step, step 141, is to find a pattern in the stored data stream which matches a portion of the transmitted burst. Thus, the data stream may be searched for the first cycle which occurs at frequency f2. Searching for such a pattern is a straight forward matter because the burst is no longer a set of identical cycles. The digitized version 88 of the input signal 78 in the random access memory 66 will show the same mix of wavelength changes as the original burst 70. Regardless of the actual pattern, a simple search and match routine will find the pattern at step 141. Once the pattern is located, at step 142 it is a simple matter to calculate backwards to determine where the leading edge of the first cycle at frequency f1 should appear based on the knowledge of when that first cycle was transmitted.

Regardless of which method, A or B, is used to determine the leading edge of the input signals 78, the calculations made in the steps identified in FIG. 13 will have the necessary accuracy because the calculations will be based on the true leading edge of the received echo.

In summary, the system of the present invention performs the following functions and provides the following advantages:

(a) measures the distance from the top of the fill pipe to the top of the product in a tank;

(b) utilizes several reflectors at fixed distances with respect to each other within the fill pipe to compensate for variations in the speed of sound;

(c) utilizes the distance between reflectors as a reference and not the absolute position of the reflectors with respect to the top of the fill pipe;

(d) digitizes the echo data and stores it in memory so that it can be processed at a later time rather than in real-time;

(e) utilizes a specially positioned reflector in each tank to identify the particular tank in which the measurement is being made;

(f) provides for the input of tank totalizer readings through the key pad (tank totalizer readings indicate the amount of product that has been removed from the tank);

(g) automatically reconciles tank totalizer entries with tank inventory;

(h) compiles long-term records and produces reports based on the processed data; and (i) provides for the entry of product drops in order to determine product expansion and contraction due to temperature changes (product drops refer to the amount of product that has been added to the tank).

While the present invention has been described in connection with an exemplary embodiment thereof, it will be understood that many modifications and variations will be readily apparent to those of ordinary skill in the art. This disclosure in the following claims are intended to cover all such modifications and variations.

What we claim is:

1. A system for measuring the level of a fluid in a tank, comprising:

a plurality of reflectors positioned in the tank with said reflectors being a known distance from one another and a first reflector being an unknown distance from the top of the tank; and an apparatus for producing and outputting a sonic signal and for receiving echoes from said plurality of reflectors and a surface of the fluid in the tank, said apparatus producing electrical signals representative of said received echoes, said apparatus including processor means responsive to said electrical signals for, (i) calculating the distance between said apparatus and said first reflector, (ii) calculating the distance between a last reflector above the fluid surface and the fluid surface, and (iii) determining the total distance from said apparatus to the fluid surface based on the distances calculated in (i), (ii), and the distance between said first and last reflectors.

2. The system of claim 1 wherein said plurality of reflectors includes a plurality of reflectors positioned to form a reflector ladder.

3. The system of claim 2 wherein said tank includes a fill pipe, and wherein said reflector ladder is positioned in the fill pipe.

4. The system of claim 3 additionally comprising coupling means carried by said apparatus for coupling said apparatus to the fill pipe.

5. The system of claim 4 wherein said apparatus is portable.

6. The system of claim 5 wherein said reflector ladder carries an additional reflector which produces echoes for uniquely identifying the tank.

7. A portable apparatus for measuring the level of a fluid in a tank, said apparatus for use with a plurality of reflectors positioned in the tank with the reflectors being a known distance from one another and a first reflector being an unknown distance from said apparatus, said apparatus comprising:

means for producing an output signal;

transducer means responsive to said output signal for outputting a sonic signal and for producing input signals in response to echoes from the plurality of reflectors and a surface of the fluid in the tank; and processor means responsive to said input signals for, (i) calculating the distance between the apparatus and the first reflector, (ii) calculating the distance between a last reflector above the fluid surface and the fluid surface, and (iii) determining the total distance from the apparatus to the fluid surface based on the distances calculated in (i), (ii), and the distance between the first and last reflectors.

8. The apparatus of claim 7 additionally comprising means for digitizing said input signals and means for sampling said digitized input signals at discrete sample times to produce a data stream, and wherein said processor means receives said data stream from said means for sampling.

9. The apparatus of claim 8 wherein said processor means determines the number of sample times between when said sonic signal was output and when the echoes from the first and a second reflector are received and calculates the distance between the apparatus and the first reflector based on said determined numbers of sample times and the known distance between the first and second reflectors.

10. The apparatus of claim 9 wherein said processor means determines (i) the number of sample times between when said sonic signal was output and when the echoes from the surface of the fluid, last reflector, and a next to last reflector are received, (ii) the time interval for the sonic signal to travel between the last and next to last reflectors based on said determined number of sample times, and (iii) the time interval for the sonic signal to travel from the last reflector to the surface of the fluid based on said determined number of sample times, and wherein said processor means calculates the distance between the last reflector and the surface of the fluid based on said time intervals and the known distance between the last and next to last reflectors.

11. The apparatus of claim 10 wherein said processor means calculates the total distance by (i) determining the number of reflectors between the first and last reflectors and (ii) adding the known distance between the determined number of reflectors to the calculated distance from the first reflector to the apparatus and the calculated distance from the last reflector to the surface of the fluid.

12. The apparatus of claim 8 additionally comprising amplifying means positioned between said transducer and said means for digitizing, said amplifying means having a variable gain controlled by said processor means.

13. The apparatus of claim 12 and wherein said means for digitizing includes a comparator responsive to said amplifying means and wherein said means for sampling includes a shift register.

14. The apparatus of claim 7 wherein said means for producing an output signal includes means for producing a first output signal having a first frequency and a second output signal having a second frequency, and wherein said processor means determines the leading edge of an echo based on the difference in arrival times between the echoes resulting from said first and second output signals.

15. The apparatus of claim 7 wherein said means for producing an output signal includes means for producing an output signal of varying frequency, and wherein said processor means compares the pattern of frequency changes of the received echoes to the original pattern of frequency changes to determine the leading edge of the echoes.

16. The apparatus of claim 7 wherein said means for producing an output signal includes a latch responsive to said processor means.

17. The apparatus of claim 7 additionally comprising means for storing information about the tank, and wherein said processor means calculates the volume of fluid in the tank based on the calculated total distance from the apparatus to the surface of the fluid and said stored information.

18. The apparatus of claim 17 additionally comprising means for storing the calculated volume, and additionally comprising means for receiving input information regarding fluid removal, said processing means being responsive to said stored volume information and said input information to perform inventory control functions.

19. The apparatus of claim 7 additionally comprising means for identifying the tank based on the received echoes.

20. A method of measuring the level of a fluid in a tank having a plurality of reflectors positioned therein with the reflectors being a known distance from one another and a first reflector being an unknown distance from the top of the tank, said method comprising the steps of:
outputting a sonic signal into the tank;
producing input signals in response to echoes from the plurality of reflectors and a surface of the fluid in the tank;
(i) calculating the distance between the top of the tank and the first reflector;
(ii) calculating the distance between a last reflector above the fluid surface and the fluid surface; and
determining the total distance from the top of the tank to the fluid surface based on the distances calculated in (i), (ii), and the distance between the first and last reflectors.

21. The method of claim 20 additionally comprising the steps of digitizing said input signals and sampling said digitized input signals at discrete sample times to produce a data stream.

22. The method of claim 21 additionally comprising the steps of determining the number of sample times between when said sonic signal was output and when the echoes from the first and a second reflector are received, and wherein said step of calculating the distance between the top of the tank and the first reflector is based on said determined number of sample times and the known distance between the first and second reflectors.

23. The method of claim 22 additionally comprising the step of determining (i) the number of sample times between when said sonic signal was output and when the echoes from the surface of the fluid, last reflector, and a next to last reflector are received, (ii) the time interval for the sonic signal to travel between the last and next to last reflectors based on said determined number of sample times, and (iii) the time interval for the sonic signal to travel from the last reflector to the surface of the fluid based on said determined number of sample times, and wherein said step of calculating the distance between the last reflector and the surface of the fluid is based on said time intervals and the known distance between the last and next to last reflectors.

24. The method of claim 23 wherein said step of calculating the total distance includes the steps of (i) determining the number of reflectors between the first and last reflectors and (ii) adding the known distance between the determined number of reflectors to the calculated distance from the first reflector to the top of the tank and the calculated distance from the last reflector to the surface of the fluid.

25. The method of claim 20 wherein said step of outputting a sonic signal includes the step of producing a first signal having a first frequency and a second signal having a second frequency, said method additionally comprising the step of determining the leading edge of an echo based on the difference in arrival times between the echoes resulting from said first and second signals.

26. The method of claim 20 wherein said step of outputting a sonic signal includes the step of producing a signal of varying frequency, said method additionally comprising the step of comparing the pattern of frequency changes of the input signals to the original pattern of frequency changes to determine the leading edge of the echoes.

27. The method of claim 20 additionally comprising the steps of storing information about the tank and calculating the volume of fluid in the tank based on the calculated total distance from the top of the tank to the surface of the fluid and said stored information.

28. The method of claim 27 additionally comprising the steps of storing the calculated volume, receiving input information regarding fluid removal, and performing inventory control functions based on said stored volume information and said input information.

29. The method of claim 20 additionally comprising the step of identifying the tank based on the received echoes.

* * * * *

UNITED STATES PATENT AND TRADEMARK OFFICE
CERTIFICATE OF CORRECTION

PATENT NO. : 4,928,525

DATED : May 29, 1990

INVENTOR(S) : Gary L. Aderholt and Michael A. Lenox

It is certified that error appears in the above-identified patent and that said Letters Patent is hereby corrected as shown below:

Col. 13, line 54, before "(f1)" insert --$\lambda$--.

Signed and Sealed this

Seventeenth Day of September, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,928,525

DATED : May 29, 1990

INVENTOR(S) : Gary L. Aderholt and Michael A. Lenox

It is certified that error appears in the above-identified patent and that said Letters Patent is hereby corrected as shown below:

Col. 8, line 27, after "top" and before "the", insert --of--.

Col. 9, lines 11 and 12, delete [microprocessors's] and substitute therefor --microprocessor's--.

Signed and Sealed this

Eighteenth Day of February, 1992

*Attest:*

HARRY F. MANBECK, JR.

*Attesting Officer*      *Commissioner of Patents and Trademarks*